(12) United States Patent
Xu et al.

(10) Patent No.: US 8,279,797 B2
(45) Date of Patent: Oct. 2, 2012

(54) CROSS-PAGING BETWEEN COMMUNICATION NETWORKS

(75) Inventors: Xiang Xu, Nanjing (CN); James S. Marin, Murphy, TX (US); Shahab M. Sayeedi, Naperville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1743 days.

(21) Appl. No.: 11/415,793

(22) Filed: May 2, 2006

(65) Prior Publication Data

US 2006/0251058 A1 Nov. 9, 2006

Related U.S. Application Data

(60) Provisional application No. 60/678,063, filed on May 5, 2005.

(51) Int. Cl.
*H04W 4/00* (2009.01)
(52) U.S. Cl. ........ 370/328; 370/335; 370/342; 370/352; 370/441; 455/426.1
(58) Field of Classification Search .......... None
See application file for complete search history.

(56) References Cited

U.S. PATENT DOCUMENTS

| | | | |
|---|---|---|---|
| 7,336,951 B2 * | 2/2008 | Choi et al. | 455/436 |
| 7,373,146 B2 * | 5/2008 | Kong et al. | 455/426.1 |
| 7,668,136 B2 * | 2/2010 | Yu | 370/329 |
| 7,817,574 B2 * | 10/2010 | Xu et al. | 370/252 |
| 7,916,715 B2 * | 3/2011 | Rezaiifar et al. | 370/352 |
| 2002/0147010 A1 | 10/2002 | Cruz et al. | |
| 2004/0120283 A1 | 6/2004 | Rezaiifar et al. | |
| 2004/0185879 A1 | 9/2004 | Kong et al. | |
| 2006/0003772 A1 * | 1/2006 | Semper | 455/452.1 |
| 2006/0182069 A1 * | 8/2006 | Yu | 370/335 |
| 2008/0096584 A1 * | 4/2008 | Xu et al. | 455/458 |
| 2009/0225723 A1 * | 9/2009 | Tenneti et al. | 370/331 |

OTHER PUBLICATIONS

3G: $3^{rd}$ Generation Partnership Project 2 "3GPP2", Subnet based Mobility Management in Cross Paging (stage 2), Feb. 14, 2005, Tokyo Japan, A40-20050214-, pp. 1-4.
3GPP2 N.S00005-0, 3G: $3^{rd}$ Generation Partnership Project 2 "3GPP2", Cellular Radiotelecommunications Intersystem Operations, Version 1.0, pp. 6-179 to 6-185.

* cited by examiner

*Primary Examiner* — Michael J Moore, Jr.

(57) ABSTRACT

A system and method to provide cross-paging between circuit and packet data networks includes providing a mobile station being on a circuit-switched communication in a first area while maintaining a packet data session on the packet data network. When the mobile station moves to a second location area served by the circuit-switched network while the mobile station is still idle with respect to packet communications on the packet data network the location of the mobile station with respect to the circuit-switched network becomes unknown by the packet data network. In this case, the circuit-switched network informs the packet data network of a change in the mobile switching center serving the mobile station.

20 Claims, 10 Drawing Sheets

| INFORMATION ELEMENT | ELEMENT DIRECTION |
|---|---|
| A13 MESSAGE TYPE | SOURCE AN/PCF→ TARGET AN/PCF |
| MOBILE IDENTITY | SOURCE AN/PCF→ TARGET AN/PCF |

| 7 | 6 | 5 | 4 | 3 | 2 | 1 | 0 | OCTET |
|---|---|---|---|---|---|---|---|---|
| ⇒ A13 MESSAGE TYPE = [0xH] ||||||||  1 |
| ⇒ CORRELATION ID: A13 ELEMENT IDENTIFIER = [0xH] |||||||| 1 |
| LENGTH = [04H] |||||||| 2 |
| (MSB) CORRELATION VALUE = <ANY VALUE> |||||||| 3 |
|  |||||||| 4 |
|  |||||||| 5 |
| (LSB) |||||||| 6 |
| ⇒ MOBILE IDENTITY : A13 ELEMENT IDENTIFIER = [05H] |||||||| 1 |
| LENGTH = 10-15 DIGITS |||||||| 2 |
| IDENTITY DIGIT 1 = [0H-9H] (BCD) |||| ODD/EVEN INDICATOR = [1,0] ||| TYPE OF IDENTITY = [110] (MN ID) | 3 |
| IDENTITY DIGIT 3 = [0H-9H] (BCD) |||| IDENTITY DIGIT 2 = [0H-9H] (BCD) |||| 4 |
| o o o |||| o o o |||| o o o |
| IDENTITY DIGIT N+1 = [0H-9H] (BCD) |||| IDENTITY DIGIT N = [0H-9H] (BCD) |||| k |
| = [1111] (IF EVEN NUMBER OF DIGITS) |||| IDENTITY DIGIT N+2 = [0H-9H] (BCD) |||| k+1 |

*FIG. 8*

| INFORMATION ELEMENT | ELEMENT DIRECTION |
|---|---|
| A13 MESSAGE TYPE | TARGET AN/PCF→ SOURCE AN/PCF |
| MOBILE IDENTITY | SOURCE AN/PCF→ TARGET AN/PCF |
| CAUSE | TARGET AN/PCF→ SOURCE AN/PCF |

| 7 | 6 | 5 | 4 | 3 | 2 | 1 | 0 | OCTET |
|---|---|---|---|---|---|---|---|---|
| ⇒ A13 MESSAGE TYPE = [0xH] ||||||||| 1 |
| ⇒ CORRELATION ID: A13 ELEMENT IDENTIFIER = [0xH] ||||||||| 1 |
| LENGTH = [04H] ||||||||| 2 |
| (MSB) CORRELATION VALUE = <ANY VALUE> ||||||||| 3 |
| ||||||||| 4 |
| ||||||||| 5 |
| (LSB) ||||||||| 6 |
| ⇒ MOBILE IDENTITY : A13 ELEMENT IDENTIFIER = [05H] ||||||||| 1 |
| LENGTH = 10-15 DIGITS ||||||||| 2 |
| IDENTITY DIGIT 1 = [0H-9H] (BCD) |||| ODD/EVEN INDICATOR = [1,0] ||| TYPE OF IDENTITY = [110] (MN ID) || 3 |
| IDENTITY DIGIT 3 = [0H-9H] (BCD) |||| IDENTITY DIGIT 2 = [0H-9H] (BCD) |||| 4 |
| o o o |||| o o o |||| o o o |
| IDENTITY DIGIT N+1 = [0H-9H] (BCD) |||| IDENTITY DIGIT N = [0H-9H] (BCD) |||| k |
| = [1111] (IF EVEN NUMBER OF DIGITS) |||| IDENTITY DIGIT N+2 = [0H-9H] (BCD) |||| k+1 |
| ⇒ CAUSE: A13 ELEMENT IDENTIFIER = [04H] ||||||||| 1 |
| LENGTH = [01H] ||||||||| 2 |
| CAUSE VALUE = [ 06H (1x PAGING REQUEST FAILED) 07H (1x PAGING REQUEST SUCCESSFUL] ||||||||| 3 |

*FIG. 9*

| INFORMATION ELEMENT | ELEMENT DIRECTION |
|---|---|
| MESSAGE TYPE | MSC -> BS |
| MOBILE IDENTITY (IMSI) | MSC -> BS |
| MOBILE IDENTITY (ESN) | MSC -> BS |
| TAG | MSC -> BS |
| CAUSE | MSC -> BS |
| MOBILE IDENTITY (MEID) | MSC -> BS |
| MSC ID | MSC -> BS |

| 7 | 6 | 5 | 4 | 3 | 2 | 1 | 0 | OCTET |
|---|---|---|---|---|---|---|---|---|
| ⇒ BSMAP HEADER: MEASSAGE DISCRIMINATION = [00H] | | | | | | | | 1 |
| LENGTH INDICATOR (LI) = <VARIABLE> | | | | | | | | 2 |
| MESSAGE TYPE: = [0AH] | | | | | | | | 1 |
| ⇒ MOBILE IDENTITY: (IMSI): A1 ELEMENT IDENTIFIER = [0DH] | | | | | | | | 1 |
| LENGTH = [06H-08H] (10-15 DIGITS) | | | | | | | | 2 |
| IDENTITY DIGIT 1 = [0H-9H] (BCD) | | | | ODD/EVEN INDICATOR = [1,0] | | | TYPE OF IDENTITY = [110] (IMSI) | 3 |
| IDENTITY DIGIT 3 = [0H-9H] (BCD) | | | | IDENTITY DIGIT 2 = [0H-9H] (BCD) | | | | 4 |
| o o o | | | | | | | | o o o |
| IDENTITY DIGIT N+1 = [0H-9H] (BCD) | | | | IDENTITY DIGIT N = [0H-9H] (BCD) | | | | n |
| = [1111] (IF EVEN NUMBER OF DIGITS), IDENTITY DIGIT N+3 = [0H-09] (BCD) ( IFF ODD NUMBER OF DIGITS) | | | | IDENTITY DIGIT N+2 = [0H-9H] (BCD) | | | | n+1 |
| ⇒ MOBILE IDENTITY: (ESN): A1 ELEMENT IDENTIFIER = [0DH] | | | | | | | | 1 |
| LENGTH = [05H] | | | | | | | | 2 |
| IDENTITY DIGIT 1 = [0000] | | | | ODD/EVEN INDICATOR = [0] | | | TYPE OF IDENTITY = [101] (IMSI) | 3 |
| (MSB) | ESN = <ANY VALUE> | | | | | | | 4 |
| | | | | | | | | 5 |

*FIG. 10A* (A)

| | | | |
|---|---|---|---|
| | | | 6 |
| | | (LSB) | 7 |
| ⇒ TAG: | A1 ELEMENT IDENTIFIER = [33H] | | 1 |
| (MSB) | TAG VALUE = <ANY VALUE> | | 2 |
| | | | 3 |
| | | | 4 |
| | | (LSB) | 5 |
| ⇒ CAUSE: | A1 ELEMENT IDENTIFIER = [04H] | | 1 |
| | LENGTH = [01H] | | 2 |
| ext = [0] | CAUSE VALUE = [08H (MS BUSY), 11H (SERVICE OPTION NOT AVAILABLE)] | | 3 |
| ⇒ MOBILE IDENTITY (MEID): | A7 ELEMENT IDENTIFIER = [0DH] | | 1 |
| | LENGTH = [08H] | | 2 |
| MEID HEX DIGIT 1 = [0H-FH] | ODD/EVEN INDICATOR = [1,0] | TYPE OF IDENTITY = [110] (IMSI) | 2 |
| MEID HEX DIGIT 3 = [0H-FH] | MEID HEX DIGIT 2 = [0H-FH] | | 4 |
| MEID HEX DIGIT 5 = [0H-FH] | MEID HEX DIGIT 4 = [0H-FH] | | 5 |
| MEID HEX DIGIT 7 = [0H-FH] | MEID HEX DIGIT 6 = [0H-FH] | | 6 |
| MEID HEX DIGIT 9 = [0H-FH] | MEID HEX DIGIT 8 = [0H-FH] | | 7 |
| MEID HEX DIGIT 11 = [0H-FH] | MEID HEX DIGIT 10 = [0H-FH] | | 8 |
| MEID HEX DIGIT 13 = [0H-FH] | MEID HEX DIGIT 12 = [0H-FH] | | 9 |
| FIH = [FH] | MEID HEX DIGIT 14 = [0H-FH] | | 10 |
| ⇒ MSC ID: | A1 ELEMENT IDENTIFIER = [0xyH] | | 1 |
| (MSB) | MSCID | | 2 |
| | | | 3 |
| | | (LSB) | 4 |

*FIG. 10B*

CROSS-PAGING BETWEEN COMMUNICATION NETWORKS

FIELD OF THE INVENTION

The present invention relates generally to the field of communication systems, and more particularly, to a paging between communication networks.

BACKGROUND OF THE INVENTION

The Third Generation Partnership Project 2 (3GPP2) Code Division Multiple Access (CDMA), known as 3GPP2 cdma2000, networks supports concurrent services functionality for packet data and circuit switched voice communication). The original system supports packet data and circuits switched voice communication and is commonly referred to as the cdma2000 1X system. The cdma2000 1X system air interface is standardized in 3GPP2 document C.S0001 through C.S0005 and corresponding Telecommunication Industry Associates (TIA) standard TIA-2000. In addition, new packet data standards, such as cdma2000 High Rate Packet Data (cdma2000 HRPD1X) have been created. The cdma2000 HRPD air interface is standardized in 3GPP2 document C.S0024-A and C.S0063. To ensure communication continuity for a mobile radio communication device moving between overlaid 1x and packet data networks, it is desired to provide Cross-Paging capabilities that enables a mobile unit to be notified of incoming 1x circuit voice calls when the mobile is operating on the HRPD network, and notifies the mobile of incoming packet data in the HRPD packet data network when the mobile is operating on the 1X network.

A 3GPP2 Radio Access Network (RAN) to support cross paging consists of an Mobile Switching Center (MSC), a 1x BS (Base Station), an HRPD AN (Access Network or Access Node), an HRPD PCF, and a Packet Data Serving Node (PDSN) and is standardized for two different RAN architectures in 3GPP2 A.S0008-A and A.S0009. An interworking system (IWS) function has been introduced in 3GPP2 for an access network (AN) and for a packet control function (PCF), depending on the architecture deployed, to connect a HRPD system with a 1X system. However by definition, the IWS can only connect to one 1X mobile switching center (MSC), so the current standard and contributions are based on the prerequisite that mobile's serving IWS connects to mobile's serving 1X MSC. However, this situation cannot be guaranteed due to mobility and real deployment. For example, in the following two scenarios, a mobile's serving 1X MSC is different to the one that mobile's serving IWS connects to.

In a first problem scenario: during a 1X circuit voice call, a mobile can move across a 1X MSC boundary and a HRPD subnet or packet zone boundary while busy with a circuit voice call, i.e. an active handoff occurs. As a result, the mobile cannot perform a HRPD location update during a 1X call, because the mobile does not know that it has changed HRPD subnet and cannot monitor both 1x and HRPD systems simultaneously while it is active on a call. So, from the perspective of a packet data network it is unaware that the mobile's serving MSC has changed, and subsequently the IWS does not connect to the mobile's new serving 1X MSC.

In a second problem scenario: in the real deployment, a serving HRPD subnet or packet zone may be split into two areas that are served by independent 1X MSCs. For example, a western geographic area can be covered by 1X MSC1, and an eastern geographic area is covered by 1X MSC2. If it is assumed that the IWS connects to MSC1, for a mobile in the east area, its serving IWS does not connect to its serving 1X MSC, i.e., MSC2. As a result, the mismatch in above two problem scenarios will cause cross-paging to fail, since the current 3GPP2 standard and contributions do not solve the above-mentioned issues.

What is needed is a technique to guarantee that HRPD to 1x Cross-Paging always works, no matter how a serving 1X MSC or serving HRPD subnet are changed, or how a HRPD subnet is overlaid in the real deployment.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention introduces a new technique to guarantee that HRPD to 1x Cross-Paging always works, no matter how a serving 1X MSC or serving HRPD subnet are changed, or how a HRPD subnet or packet zone is overlaid over a 1x network. In particular, new A13 messages are introduced to guarantee that Cross-paging always works.

In practice, dual mode cdma2000 mobile stations (MS) or Access Terminals (AT) are available that are capable of supporting communications with both cdma2000 1X and High Rate Packet Data (HRPD) circuit-switched and packet data networks. A dual mode mobile station or access terminal is also known as a Hybrid Access Terminal or HAT. One or more ANs are connected to a PCF and facilitate the transport of data packets between a MS and a Packet Data Serving Node (PDSN), which is connected to additional networks outside the access network, such as the Internet. An MS's packet data session may be in an idle, dormant, or active state. AN MS's packet data session is considered to be in the idle state when no network resources including UATI (Unicast Access Terminal Identifier), traffic channel, or AN to PCF (A8) and PCF to PDSN (A10) bearer resources have been allocated to the MS. An MS's packet data session is considered to be in the active state when a UATI, traffic channel, and A8 and A10 bearer resources have been allocated to the MS to facilitate the transfer of packet data between the PDSN and MS. AN MS's packet data session is considered to be in the dormant state when a UATI and A10 bearer resources have been allocated to the MS, but no traffic channel or A8 bearer resources have been allocated to the MS. Little or no data can be exchanged between the MS and PDSN when the packet data session is in the dormant state, however, the session can be reactivated quickly, i.e. the MS's packet data session is transitioned to the active state, when new data needs to be sent from the either the MS or PDSN.

An MS can be any communication device that communicates wirelessly or through a wired line. MSs can include any type of communication device including a radio telephone, personal digital assistant, computer, cordless phone, and the like. As described herein, the present invention is described in the context of a wireless communication devices supporting the cdma2000 standards including cdma2000 1X, and HRPD air interface standards. However, it should be recognized that the present invention can also be used in devices supporting various other air interface standards, e.g. IEEE 802.11 or IEEE 802.16 and that the descriptions used herein are by way of example only.

As used herein, the following IOS interface references and definitions apply:

The A1 interface carries signaling information between the call control and mobility management functions of the MSC and the call control component of the BS (BSC) and IWS component of an HRPD AN or HRPD PCF.

The A2 interface is used to provide a path for user traffic. The A2 interface carries 64/56 kbps PCM information (for circuit-oriented voice) or 64 kbps Unrestricted Digital Information (UDI, for ISDN) between the Switch component of the MSC and the Selection/Distribution Unit (SDU) function of the BS.

The A8 interface carries user traffic between the HRPD AN and the and the Packet Control Function (PCF).

The A9 interface carries signaling information between the HRPD AN and the PCF.

The A10 interface carries user traffic between the PCF and the PDSN.

The A11 interface carries signaling information between the PCF and the PDSN.

The A12 interface carries signaling information related to terminal authentication between the SC/MM function in the AN or PCF and the AN-AAA (Access Network Authentication, Authorization and Accounting entity).

The A13 interface carries signaling information between the SC/MM function of a source packet data node (AN or PCF depending on HRPD architecture supported) and the SC/MM function in the target packet data node (AN or PCF).

The A14 interface carries signaling information between the SC/MM function of the PCF and AN.

The A15 interface carries signaling information between AN when inter-AN paging is supported by an HRPD PCF.

The Ax interface carries user traffic between the SC/MM function of the PCF and the AN.

A HAT is a dual mode cdma2000 mobile capable of supporting both the 1x and HRPD air interface standards (3GPP2 C.S0001-C.S0005 and C.S0024).

A Source AN/PCF is the HRPD AN/PCF that is connected via an A10 connection to a PDSN that is currently supporting the HAT's packet data session in the HRPD network.

A Paging AN/PCF is the HRPD AN/PCF that receives a request from a source AN/PCF to page the mobile for packet data service. A Paging AN/PCF may be the same as the Target AN/PCF.

A Target AN/PCF is the HRPD AN/PCF that serves the HAT when it moves back from the 1x network to the HRPD network. The Source AN/PCF may be the same as Target AN/PCF if no HRPD mobility occurred while the HAT was in the 1x network. If they are different (i.e. the HAT moved into a new HRPD packet zone after entering the 1x circuit network, a dormant handoff is required after the HAT moves back to the HRPD network to move the HATs packet data session from the Source AN/PCF to the Target AN/PCF.

A Serving MSC is the 1X MSC where the HAT is registered for circuit services (mobile is within this MSCs location area) while in the 1x network. When HAT is in HRPD system, Serving 1X MSC is the same as Source 1X MSC.

A Source MSC is the 1X MSC that the Source AN/PCF is connected to (via A1). The mobile may not actually be in this MSC's location area if 1X registration is performed via HRPD system.

A Target MSC is the 1X MSC supporting the 1x cell site with the best signal quality for the mobile during a handoff in the 1x network or after a location update function.

It should be noted that in the current 3GPP2 HRPD architecture the Interworking-Solution (IWS) is considered to be co-located with the SC/MM in the AN (A.S0008-A standard) or the PCF (A.S0009 standard). The "HRPD AN/PCF" as used herein contains the IWS function. In the current 1X - HRPD Cross-Paging architecture standards proposals, the HRPD AN/PCF appears like a 1x BS to the MSC. An HRPD AN/PCF can connect to only one MSC (or IWS in the phase-2 architecture).

Figure 1:
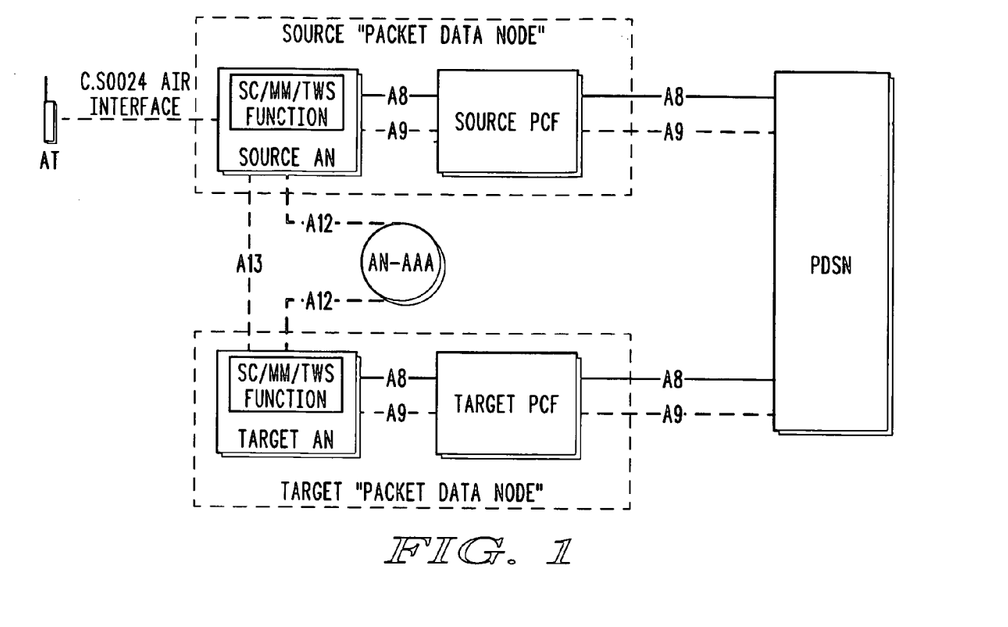
FIG. 1 shows a simplified block diagram of a first architecture utilizing the present invention.
Figure 2:
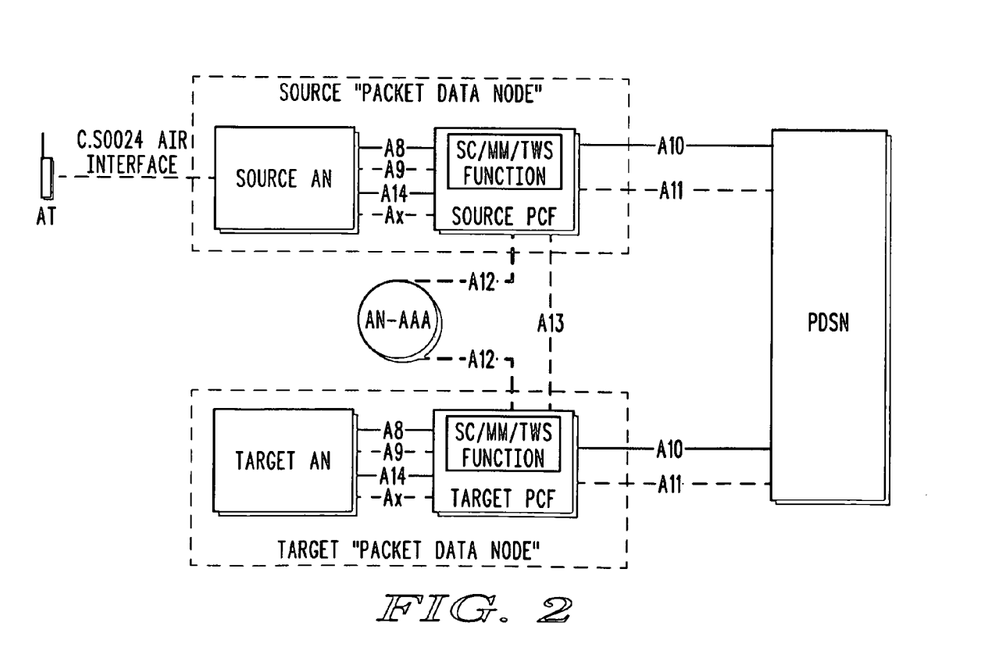
FIG. 2 shows a simplified block diagram of a second architecture utilizing the present invention.
Figure 3:
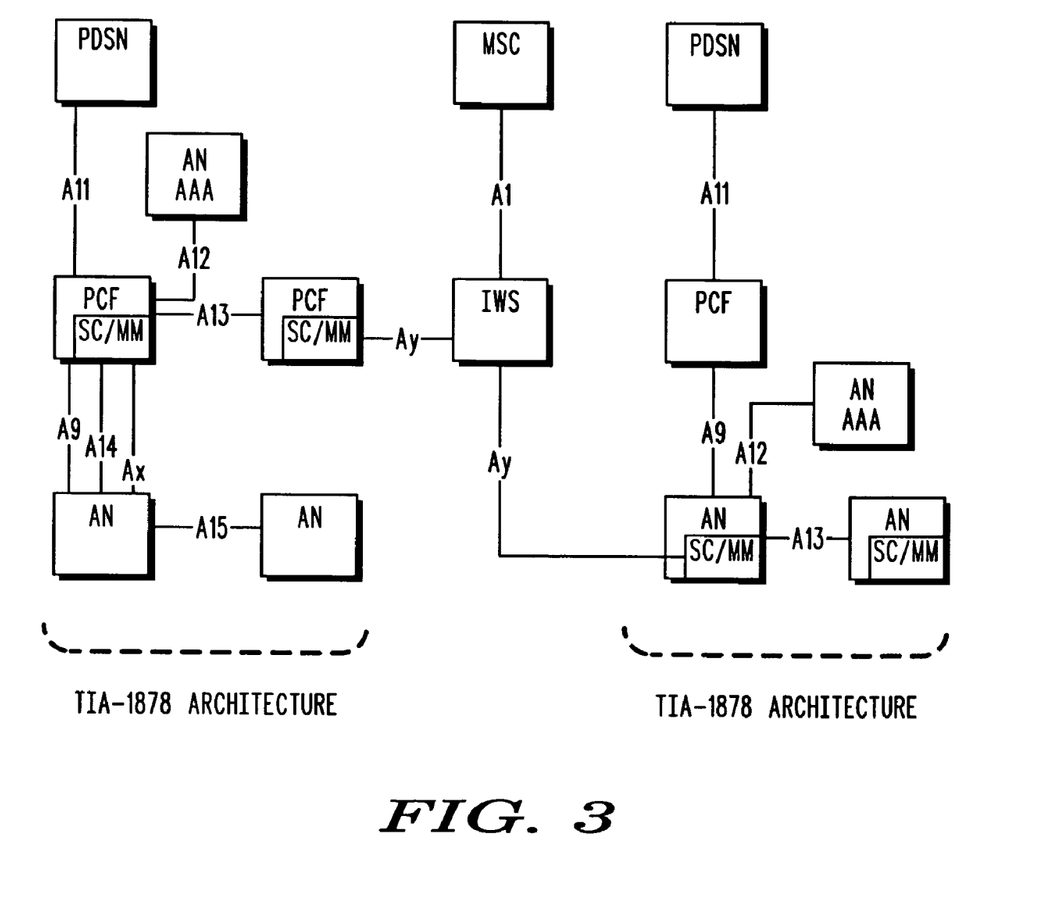
FIG. 3 shows a simplified block diagram of a third architecture utilizing the present invention.

Referring to FIGS. 1-3, and as used herein, an MS may also be referred to as an Access Terminal (AT). A Source AN/PCF is an HRPD AN/PCF that has an A10/A11 interface connection with a PDSN that is currently supporting a MS's packet data session in the HRPD network. A Paging AN/PCF is an HRPD AN/PCF that receives a request from another AN/PCF to initiate a paging request for HRPD packet data service from a 1X network to the MS. The Paging AN/PCF is an AN/PCF that is connected to the mobile stations current serving MSC and may be the same as the Target AN/PCF. The Target AN/PCF is an HRPD AN/PCF that serves the MS when it moves back from the 1X network to the HRPD network. The Source AN/PCF may be the same as Target AN/PCF. If Source AN/PCF and Target AN/PCF are different (i.e. the MS has moved to another HRPD packet zone after entering the 1X circuit-switched network, a dormant handoff is required after the MS moves back to the HRPD network to move the MS's packet data session from Source AN/PCF to the Target AN/PCF.

A Serving MSC is the 1X MSC where the MS is registered for circuit-switched services (mobile is within this MSC's location area when monitoring or active in the 1x network. When an MS is in a HRPD system, the Serving 1X MSC is the same as Source 1X MSC. The Source MSC is the 1X MSC that the Source AN/PCF is connected to (via the A1/A1p interface). The MS may not actually be in this MSC's location area if 1X registration is performed via a HRPD system. The Target MSC is the 1X MSC supporting the cell site with the best signal quality for the MS during a handoff or after a location update function.

It should be noted that in the current 3GPP2 HRPD architecture the Interworking-Solution (IWS) is considered to be co-located with the Session Control and Mobility Management (SC/MM) function in the AN (3GPP2 A.S0008-A standard) or the PCF (3GPP2 A.S0009 standard), wherein the HRPD AN/PCF appears like a 1x BS to the MSC. The term "HRPD AN/PCF" as used herein for the present invention contains the IWS function. The present invention is applicable to either of the above two architectures of FIGS. 1 and 2. However, as shown in FIG. 3, the IWS entity may be located outside of the AN or PCF. In this case source packet data moves to the IWS and then to the MSC.

Figure 4:
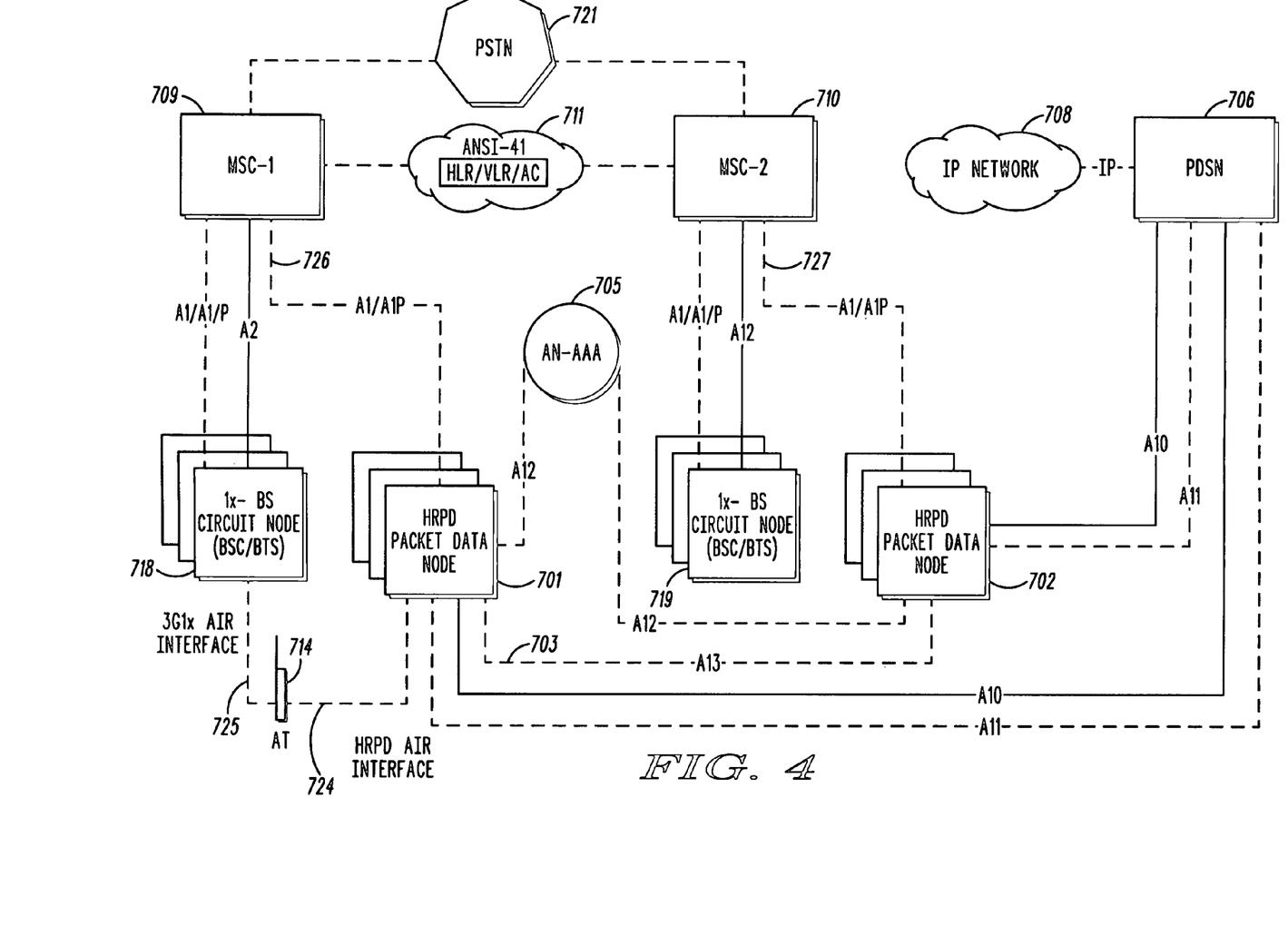
FIG. 4 shows a simplified block diagram of a fourth architecture utilizing the present invention.

FIG. 4 shows a joint 1x -HRPD architecture system block diagram, in accordance with the present invention, including a connection between two instances of an HRPD AN/PCF 701, 702 labeled as inter-packet data node interface 703 and also known as the A13 interface. In this case, the HRPD Packet Data Node could be the embodiments of either FIG. 1 or FIG. 2. In addition, the present invention would also work in an IEEE 802.11 or 802.16 system if this was not an HRPD system, and we are only dealing with packet data nodes. The packet data nodes 701 702 are coupled with the Access Network Authentication, Authorization and Accounting entity 705 through the A12 interface.

As will be shown, the A13 interface is used for, among other messages, to exchange an A13-Paging Request and A13-Paging Response message, in accordance with the present invention. The figure also shows the 1x BS-MSC interface 704, 705, also known as the A1 and A1p interface, which is used to support signaling between an MSC and 1x BS. It is also used to support signaling between an MSC and HRPD packet data node (HRPD PCF or HRPD AN) including a modified BS Service Response message containing the MSC identifier, in accordance with the present invention. Although an MSC identifier is used herein, the present invention also envisions that a cell identifier or even a target AN/PCF identifier could be used as well in place of the MSC identifier as used herein. In general, the present invention accommodates both a single PDSN and multiple PDSNs. If the network is such that any change of location of the mobile is within the scope of a single MSC, then MSC1 709, MSC2 710, collapse into a single MSC and the TIA-41 network 711 between them is not used.

The system shown in FIG. 4 provides voice and data services to a hybrid mobile device 714 consisting of a mobile station (MS) and an access terminal (AT), or Hybrid Access Terminal (HAT) 714. The system 700 provides a connection for 1x services between MS to a call partner, for example, via the public switched telephone network (PSTN) 721. The system 700 provides a connection for HRPD service between AT 714 and an HRPD calling partner. The cdma2000 1x system consists of an MS, 1x air interface 725, a 1x base station (1xBS1) 718, and MSC1 709. After the Hybrid MS/AT 714 moves to a location area served by MSC2 710 and 1xBS 719, then 1x BS2 719 provides service for 1x services so that MS maintains a connection with the 1x call partner via MSC2, TIA-41 network 711, and MSC1. The HRPD system consists of an AT 714, an HRPD air interface 724, HRPD packet data node 701 and PDSN 706. After the AT moves to the location area served by MSC2 710 and 1x BS 719, AT 714 maintains connection with the HRPD call party via HRPD packet data node 702, PDSN 706 and IP-network 708.

A key aspect of this invention is modified messages containing new signaling information between MSC1 709 and HRPD packet data node 701 via the HRPD packet data node-MSC interface 726. Another key aspect of the invention is new signaling between MSC2 710 and HRPD packet data node 702 via the 1x BS-MSC interface 727. Another key aspect of the invention is new messages and information between HRPD packet data node 1 701 and HRPD packet data node 2 702 via the HRPD inter-packet data node interface 703.

Figure 5:
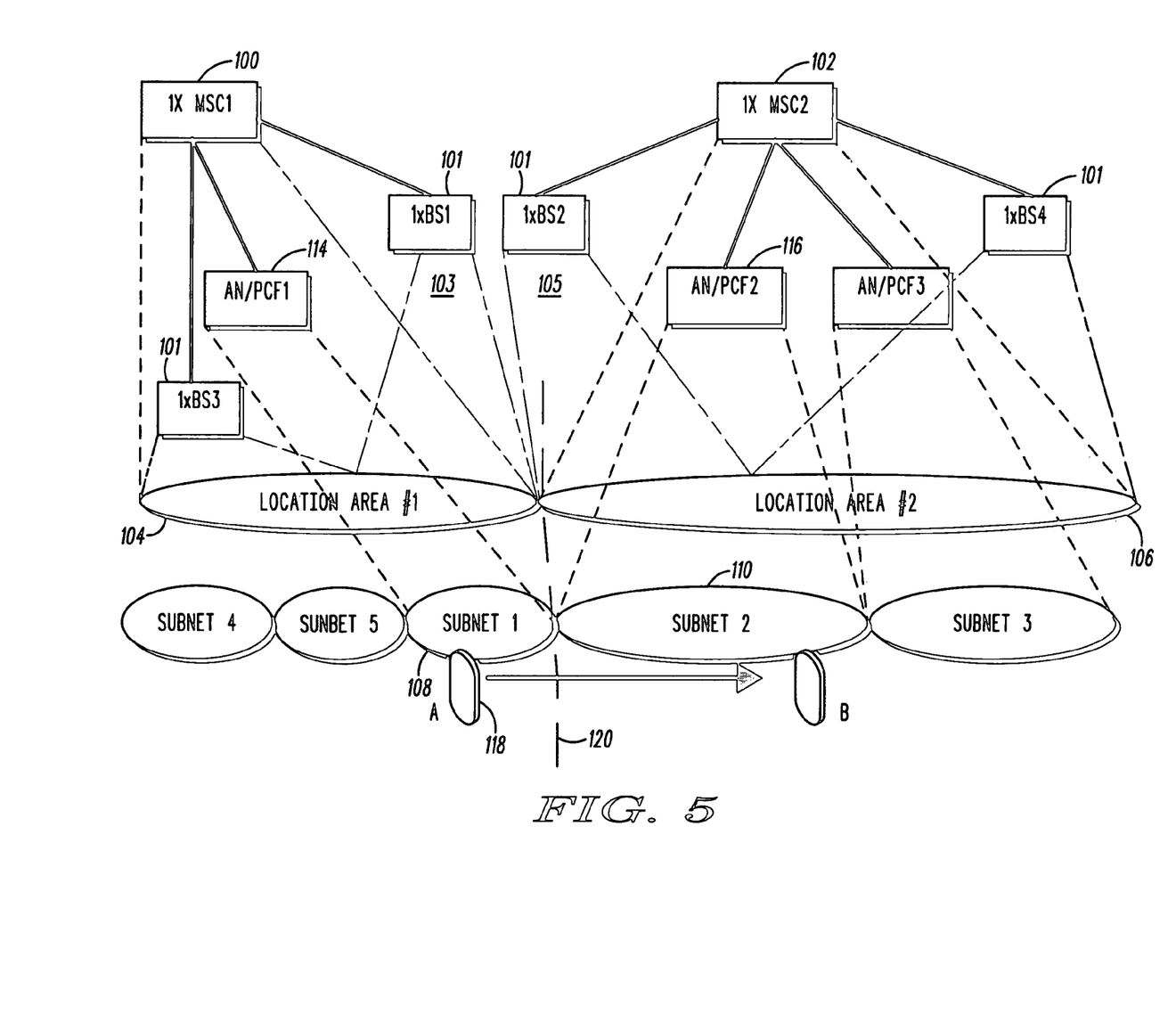
FIG. 5 shows a simplified diagram of a first problem scenario.
Figure 6:
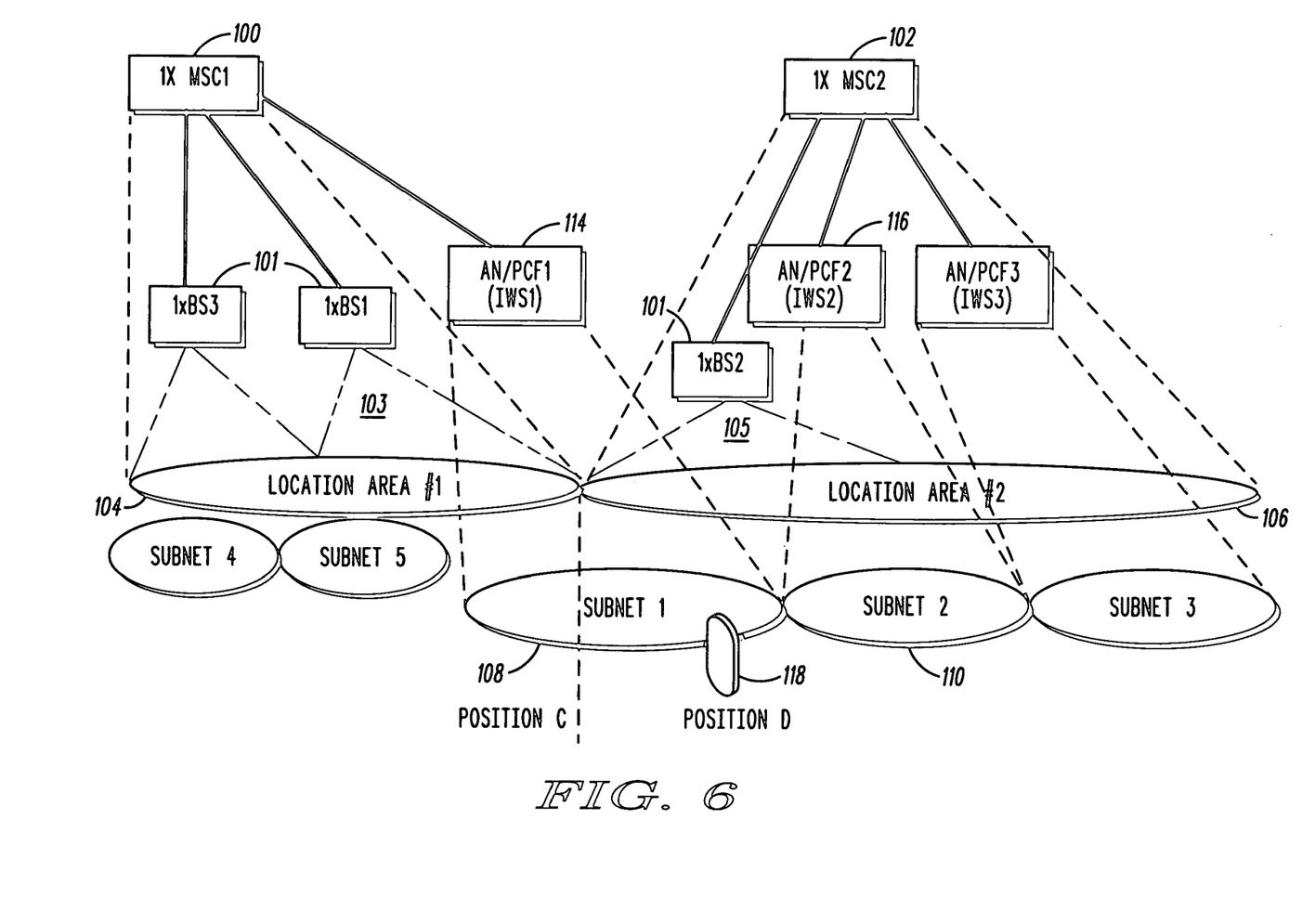
FIG. 6 shows a simplified diagram of a second problem scenario.

Referring to FIGS. 5 and 6, in a cdma2000 1X system, a geographic area is served by Mobile Switching Centers 100, 102 that each serve their own respective 1x location areas 104, 106 via 1x BSs 101 that are connected to the MSCs (as shown). A High Rata Packet Data packet data network overlays the cdma2000 1X network with subnets (or packet zones) 108, 110. Each subnet or packet zone is served by a Packet Control Function (PCF) and one or more Access Networks (AN). A single AN co-located with a PCF is shown, though each PCF may also support multiple ANs, all within the PCFs subnet or packet zone boundary. A subnet boundary or packet zone is served by one PCF. For example, AN/PCF1 node 114 provides packet data service for Subnet 1 108, and AN/PCF2 node 116 provides packet data service for Subnet 2 110.

The 1x BSs 101 are implemented with a plurality of base station controllers (BSC) base transceiver stations (BTS) dispersed throughout each location area, defining smaller regions known as cells with each base transceiver station serving one or more cells. The corresponding HRPD AN functions are the ANC (Access Network Controller) and ANTS (Access Network Transceiver Station). Both 1x and HRPD Transceivers serve one or more cells.

Upon power-up, the MS 118 registers with the MSC 100 via a 1x BS 101 serving a subset 103 of the location area 104 where the MS is located. When the MS 118 is registered, it monitors a paging channel transmitted by a 1xBS 101 connected to MSC 100 to determine when there is a communication for the MS. The communication is linked to the MS using known cdma2000 1X protocols. Alternatively, the MS can initiate a call on the cdma2000 1X system using known protocols. In either case, communications occur over an air interface to a source 1x BS.

Typically, circuit voice calls are carried over the circuit-switched network of the cdma2000 1X system. However, the MS 118 can also establish packet data communications over the cdma2000 1X network via 1x PCFs and BSs (not shown). Note that the present invention applies to packet data networks overlaid over circuit switched networks, i.e., packet data traffic is supported by the packet data access network and not the circuit access network.

When packet data arrives for the AT's HRPD packet data session supported by the A.S0008-A and A.S0009 architecture while the AT is on the 1x network, the AT must be paged so that it can be notified and requested to move back to the packet data network so that the packet data session can be reactivated and the data can be delivered to the AT. If the AT has moved to the 1x network to receive a circuit voice call, or any other reason, its dormant packet data session remains anchored in the HRPD network, and the HRPD network must cross-page the MS 118 via the 1x circuit switched network. When new packet data arrives from the PDSN at the HRPD network for an AT in the 1x network, AN/PCF 114, which is currently supporting the AT's packet data session, receives the data and requests the circuit-switched network to page the MS 118. Once a page is received by the MS 118 from the 1x network over the 1x air interface, indicating that there is packet data waiting for it in the HRPD network, the MS 118 returns to the packet data network to acquire the data packets.

Similarly, cross-paging can be used to page a mobile engaged in a packet data call in the HRPD network to alert the mobile that a circuit voice call has arrived for it in the 1x circuit-switched network. In particular, an MSC 100 of the circuit-switched network can cross-page through the packet data network by requesting AN/PCF 114 to page MS 118 for a circuit voice call over the HRPD air interface. Upon receipt of the page, the MS may move to the circuit-switched network to receive the circuit voice call while its packet data session is left dormant at AN/PCF 114 in the HRPD network.

In general, the cross-paging described above can be used successfully to provide a mobile station with both circuit-switched voice communication and packet data communication over different networks. However, problems can occur when the MS moves across sub-network boundaries while in the circuit network. These problems occur with existing HRPD networks wherein an HRPD AN/PCF can connect to only one MSC (via the IWS). For example, if a mobile station supports a packet data session in the HRPD network, and the mobile moves to the cdma2000 1X network, to receive a circuit-switched voice call or for some other event (e.g. mobile originated 1X circuit service, or IdleTunnelTimer expires, etc), the HRPD network is informed when the MS moves to the 1x circuit network. The mobile's packet data session remains anchored in the HRPD RAN in the dormant state while the mobile may be busy with a cdma2000 1X call or is idle and monitoring the cdma2000 1X network. Current 3GPP2 standards assume that the mobile's Source AN/PCF remains connected to the Serving MSC when the MS moves to the 1x network. However, in some cases this may not be true. As a result, it is not possible to successfully perform an HRPD-to-cdma2000 1X cross-page during scenarios when a MS's Source AN/PCF does not connect to the MS's Serving MSC. Two scenarios for these cases are presented below.

Referring to FIG. 5, in a first problem scenario, the circuit-switched and packet data networks share a common geographic boundary 120. While in the cdma2000 1X network, the mobile moves across boundary 120 (e.g. from position A to B) while busy with a circuit voice call. The MS 118 performs a hard handoff between 1x BS1 and 1xBS2. 1xBS1 is connected to MSC1. 1xBS2 is connected to MSC2 and these 1xBSs cover portions of the 1× location areas 104, 106 and overlaid by HRPD subnets 108, 110. MSC2 102 is now the serving MSC. However, the HRPD network is not aware that the MS has moved into a new HRPD subnet 110 since the MS cannot not perform the normal HRPD location update procedures while busy with a circuit voice call in the 1x network. In position B, the mobile's Source MSC is 1X MSC1 100 and the mobile's Serving MSC is 1X MSC2 102. The mobile's Source AN/PCF is AN/PCF1 114, which is not connected to the current Serving MSC, 1X MSC2 102. The mobile's Target AN/PCF is AN/PCF2 116.

When packet data arrives for the MS in the HRPD network, current 3GPP2 standards specify that the Source AN/PCF (i.e. AN/PCF1) requests paging for HRPD packet data service from the Source MSC (MSC1 in this case) via the IWS and the A1 interface in order to deliver the HRPD packet data call notification to the mobile via the cdma2000 1X network (i.e., HRPD-to-1X Cross-Paging). However, since the mobile is no longer within the domain of MSC1 in this scenario, paging the MS within its domain will fail.

Referring to FIG. 6 in a second problem scenario, the packet data HRPD subnet 108 spans the location areas 104, 106 served by neighboring MSCs 100, 102 and there is no common boundary. In other words, the cdma2000 1X MSC location areas are not aligned with the HRPD subnets boundaries or packet zones, which is a common scenario since 1x location areas do not map directly to HRPD subnets. Subnet 1 area 108 is divided into areas covered by two different 1X MSCs 100, 102. In this example, HRPD AN/PCF1 114 is connected to 1X MSC1 100. Position C and D are served by the same HRPD AN/PCF1, but position C is under the domain of 1xBS1 and MSC1 100 while position D is under the domain of 1xBS2 and MSC2 102 in the cdma2000 1X network. When the mobile is registered in the HRPD system in position D (mobile is receiving packet data service from the HRPD network), when the mobile performs cdma2000 1X circuit registration via the packet data network, AN/PCF1 114 will perform circuit registration procedures with MSC1 100. However, when the MS tunes to cdma2000 1X for circuit service, it will register with BS2 serving a subset 105 of location area 106 connected to 1X MSC2 102 for circuit service. In this case, the mobile's Source MSC is 1X MSC1 100, and the mobile's Serving MSC is 1X MSC2 102. The mobile's Source AN/PCF is AN/PCF1 114, which does not connect to the Serving MSC 102. The mobile's Target AN/PCF, where it returns for packet service assuming mobility didn't occur in the 1x network, is AN/PCF1 114.

As a result, HRPD-to-1X Cross-Paging does not work in this case either due to the same reason as in the first scenario of FIG. 5. When packet data arrives in the HRPD network for the mobile, MSC1 100 will be requested by AN/PCF1 to page the mobile for HRPD packet data service via the 1x circuit switched network, but since the mobile is within the domain of MSC2 102, it will not receive the page.

To summarize the problem, HRPD-to-1x Cross-Paging does not work when a MS with a packet data session anchored in the HRPD network experiences inter-MSC mobility in the cdma2000 1X network, or the mobile is located near an inter-MSC seam where it's serving HRPD AN/PCF's subnet spans the domain of two neighboring MSCs.

It should be noted that in normal cdma2000 1X circuit call scenarios, the Source MSC could use the TIA-41 InterSystemPage or InterSystemPage2 message to deliver a call after the mobile moves under the domain of a new MSC, but TIA-41 does not support the HRPD Service Option in the InterSystemPage or InterSystemPage2 message. TIA-41 also does not support a target MSC accepting an InterSystemPage or InterSystemPage2 when the mobile is already in a voice call.

The present invention includes new RAN signaling and procedures to support HRPD-1X Cross-Paging, so that it can work for all possible scenarios. As such, the present invention presents several novel aspects. Firstly, a cdma2000 1X circuit network can inform the HRPD network of the current serving MSC for the mobile if the serving MSC has changed for the mobile. In particular, an enhanced A1/A1p BS Service Response message can include the identity of mobile's Serving MSC when the serving MSC has changed in the 1x network. Secondly, new HRPD A13 signaling (Paging Request and Paging Response) is provided between PCFs (3GPP2 A.S0009 architecture) or ANs (3GPP2 A.S0008 architecture) to initiate HRPD packet data service paging from an AN/PCF different from the source AN/PCF in the HRPD network. Thirdly, a new Paging AN/PCF entity can be provided that is only used to initiate a page request from the HRPD network. The source AN/PCF (where the packet data session is currently anchored) doesn't need to know the actual target AN/PCFs identity at the time of paging since the HRPD AN/PCF knows the cell identification (cell_id) for neighboring HRPD AN/PCFs, or 1X BSs. The cell_id contains the 1X MSC_ID, or can be used derive the 1X MSC_ID.

Figure 7:
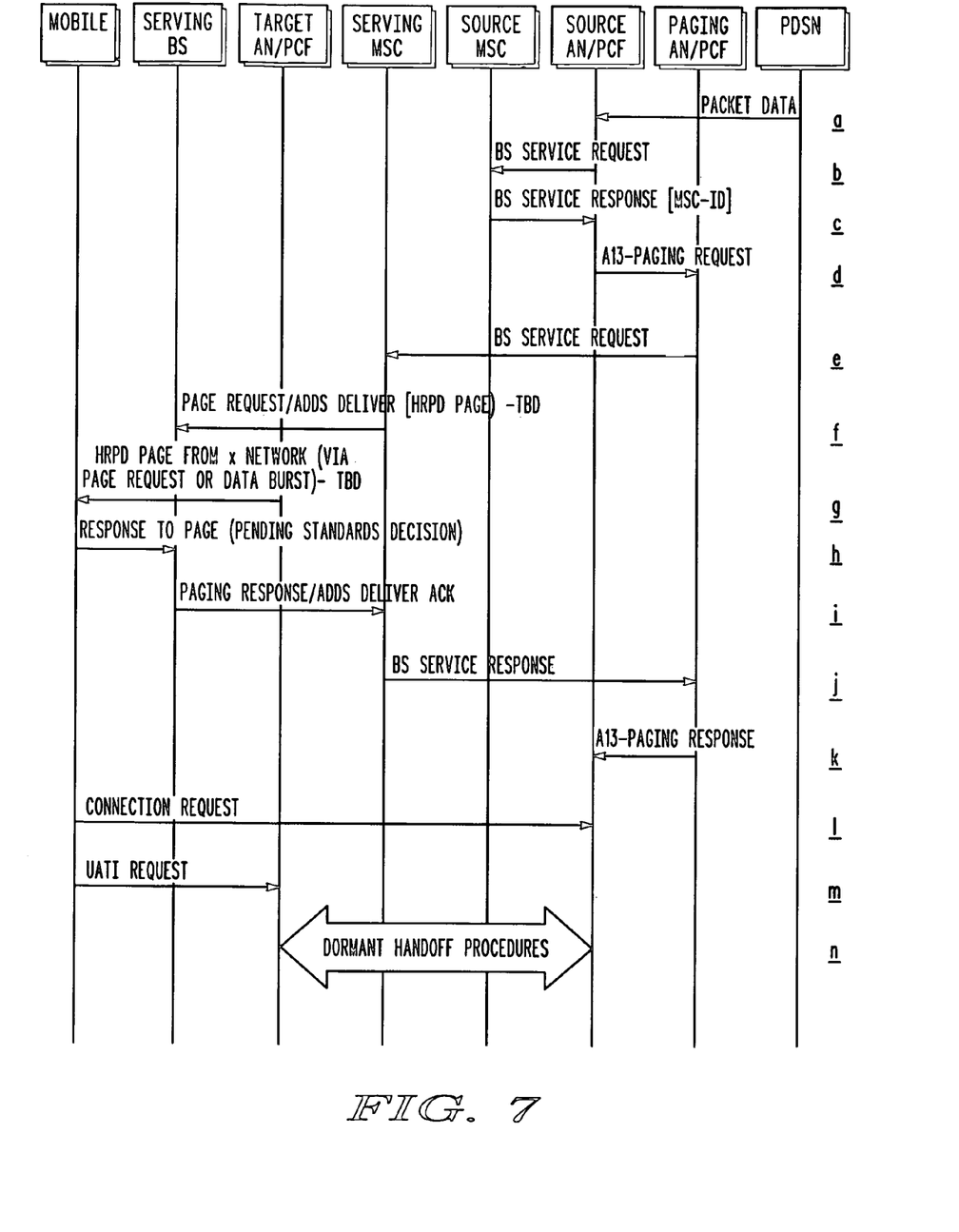
FIG. 7 shows a call flow diagram, in accordance with the present invention.

FIG. 7 provides a call flow describing new procedures and signaling, in accordance with the present invention.

In step a), the HRPD mobile is registered under Source MSC while in HRPD network. The mobile moves to the cdma2000 1x network as a result of Circuit Services Notification Protocol (CSNP) 1X cross paging, or other events (e.g. mobile-originated circuit service, IdleTunnelTimer expiry, etc.). The mobile leaves its packet data session anchored on the HRPD system at Source AN/PCF. Due to a mobility event while in the 1x network (active handoff scenario of FIG. 5), or because its HRPD subnet (i.e. packet zone) spans an inter-MSC boundary (scenario of FIG. 6), the MS is currently registered under a 1x BS within Serving MSC's domain. The PDSN sends packet data for the mobile to Source AN/PCF for the mobile.

In step b), the source AN/PCF sends a BS Service Request message to the Source MSC to request paging for HRPD packet data service from the 1x network (HRPD packet data service termination).

In step c), since the mobile is not located in Source MSC's location area, the Source MSC responds with a BS Service Response message to the Source AN/PCF, and includes a new field containing the MSC_ID of the Serving MSC. The Source MSC either explicitly knows the identity of the Serving MSC for the mobile (since it is the anchor MSC for an active call during which a 1X inter-MSC handoff occurred), or retrieves it from the HLR via existing ANSI-41 procedures when the mobile is idle.

In step d), based on the Serving MSC identifier received in the BS Service Response message, the Source AN/PCF sends a new A13-Paging Request requesting HRPD paging from the 1x network to a Paging AN/PCF which is under the domain of Serving MSC. The Paging AN/PCF is an HRPD AN/PCF that connects to the Serving MSC. Any HRPD AN/PCF can be selected to be the Paging AN/PCF as long as it is connected to Serving MSC.

In step e), the Paging AN/PCF sends a BS Service Request requesting HRPD paging to the Serving MSC.

In step f), the Serving MSC sends Serving BS to page the MS for HRPD packet data service (by sending a Paging Request or Application Data Delivery Service (ADDS) Deliver Message to Serving BS depending on whether the mobile is idle or busy with a circuit voice call).

In step g), the Serving BS pages the mobile for HRPD packet data service (by sending it a Page Request or Data Burst Message). If the MS is idle, a Paging Request with Service Option 59 (SO59) is sent. If the MS is busy, a data burst request containing a SO59 page message is sent.

In step h), the User decides whether to accept or ignore the HRPD SO notification. In this example, it is assumed that the user accepts the HRPD page and indicates it will switch to the HRPD network. The MS responds to the HRPD packet data service paging message (Page Response or L2 Acknowledge to data burst).

In step i), the Serving BS notifies the MSC (via Paging Response or ADDS Deliver Acknowledgment depending on whether the mobile was busy or idle).

In step j), the Serving MSC responds with new BS Service Response to Paging AN/PCF indicating that the MS was successfully paged.

In step k), the Paging AN/PCF responds with new A13-Paging Response Message to the Source AN/PCF.

In step l), if the MS returns to the Source AN/PCF, the MS sends a ConnectionRequest to the Source AN/PCF and the Packet data session is reactivated, wherein data is delivered to the MS, ending the call flow.

In step m), if MS mobility occurred while in the 1x network, the MS sends a UATI Request to the Target AN/PCF.

In step n), dormant mode handoff procedures from Source AN/PCF to Target AN/PCF are performed to support mobility before data is delivered to the MS.

Figure 8:
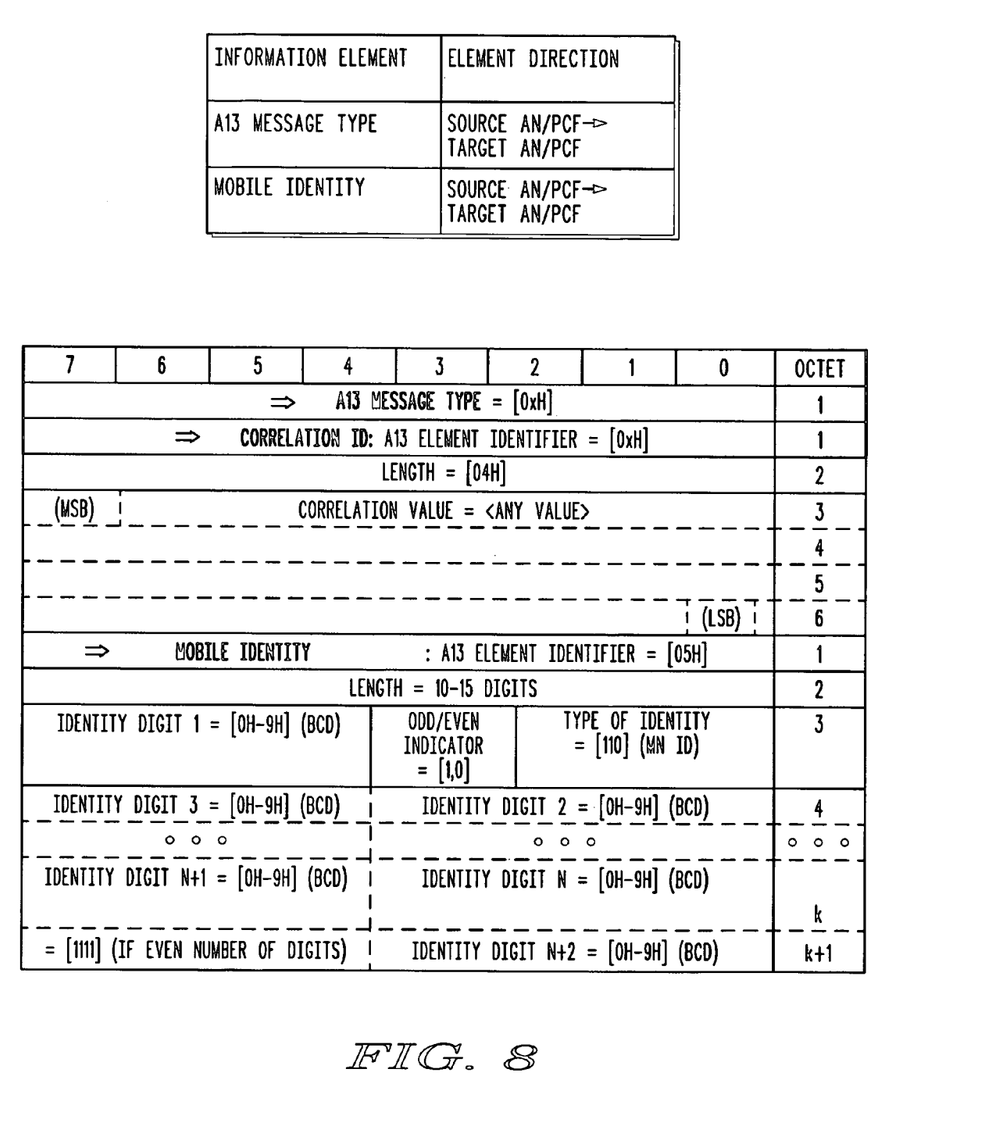
FIG. 8 shows a message table and bitmap layout for a new A13-Paging Request message, in accordance with the present invention.

FIG. 8 shows a new A13-Paging Request message table and bitmap, in accordance with the present invention. This message is sent from the source AN/PCF to a target (paging) AN/PCF to request it to initiate HRPD paging for an AT in the 1x network when the serving MSC has changed. In this example, the message contains a message type field indicating an A13-Paging Request message, Correlation ID and Mobile Identity of the mobile to be paged in the 1x network.

Figure 9:
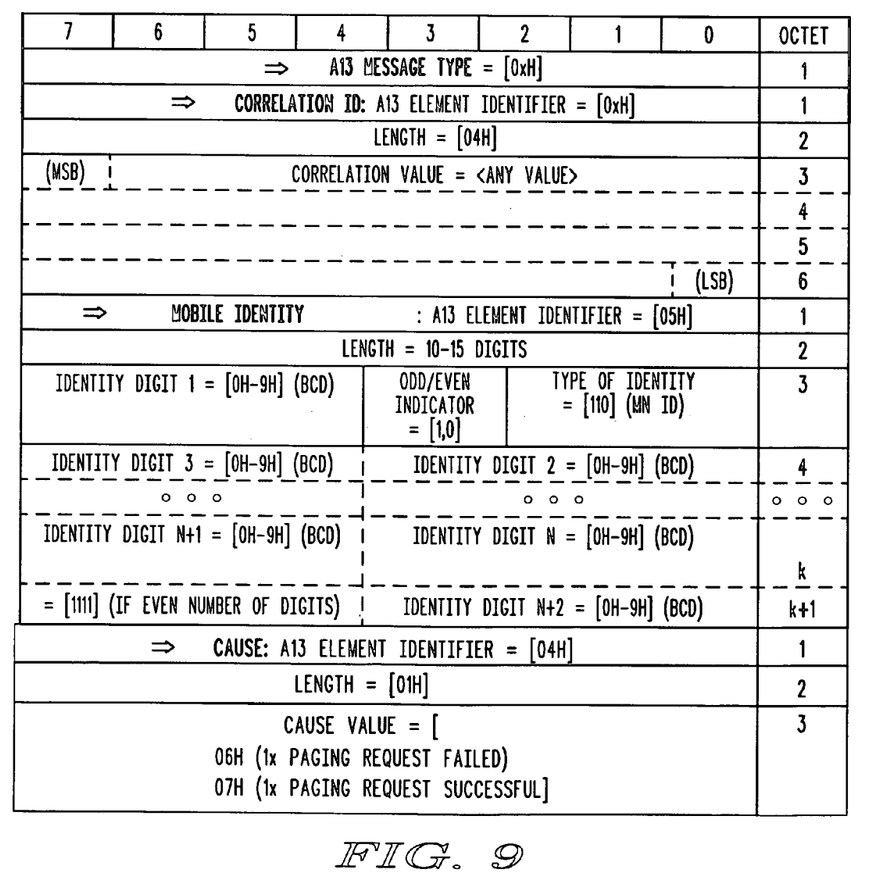
FIG. 9 shows a message table and bitmap layout for a new A13-Paging Response message, in accordance with the present invention.

FIG. 9 shows a new A13-Paging Response message table and bitmap, in accordance with the present invention. This message is sent from the target (paging) AN/PCF to the source AN/PCF and includes the result of paging the mobile in the 1x network. In this example, the message contains a message type field indicating an A13-Paging Response message, Correlation ID sent in the A13 Paging Response message, the Mobile Identity of the mobile that was requested to be paged in the 1x network, and a Cause field with Cause Values 06H and 07H to indicate whether the mobile was successfully paged in the 1x network or not.

Figure 10A:
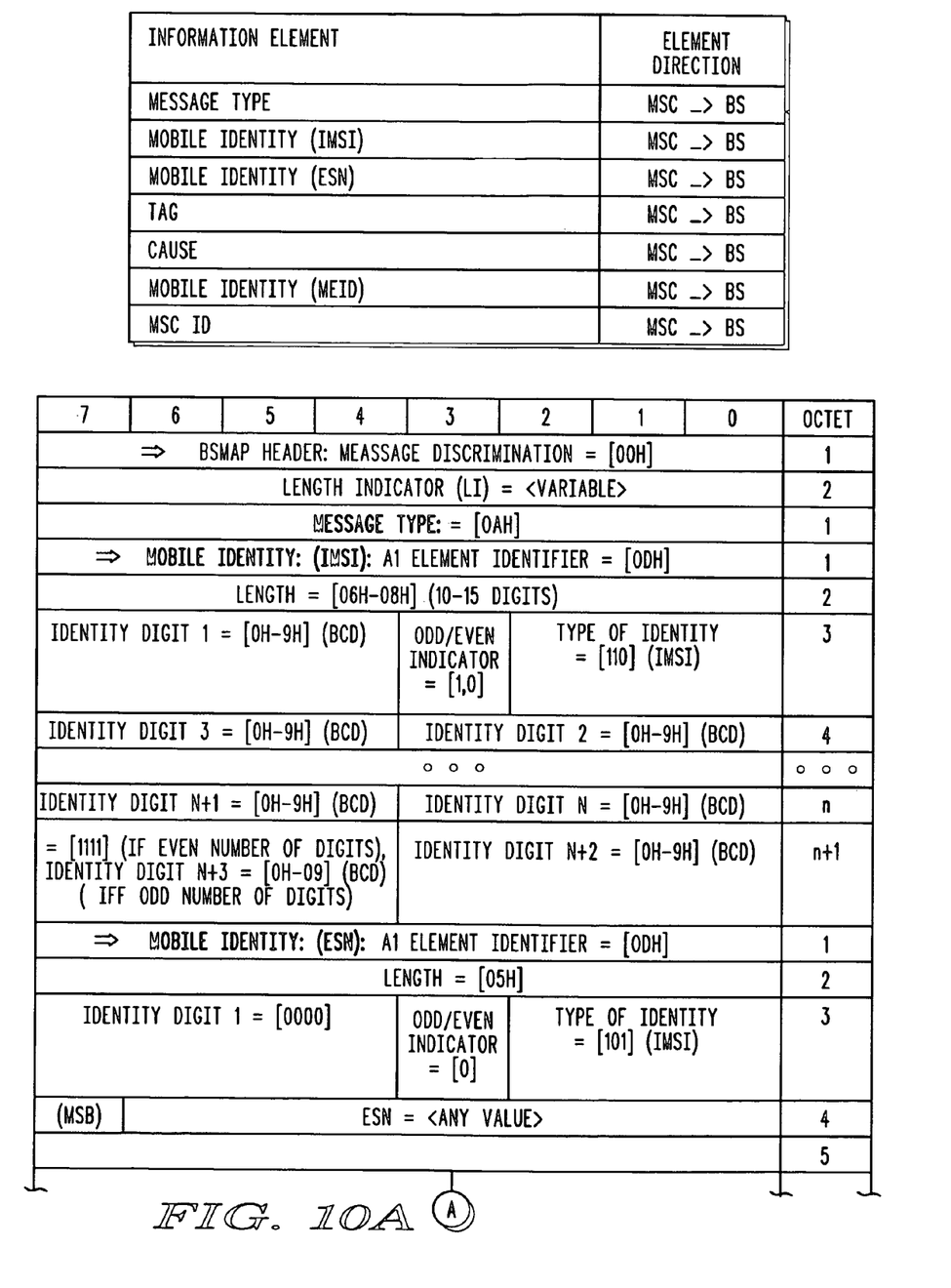
FIG. 10 shows a message table and bitmap layout for a modified BS Service Response message, in accordance with the present invention.
Figure 10B:
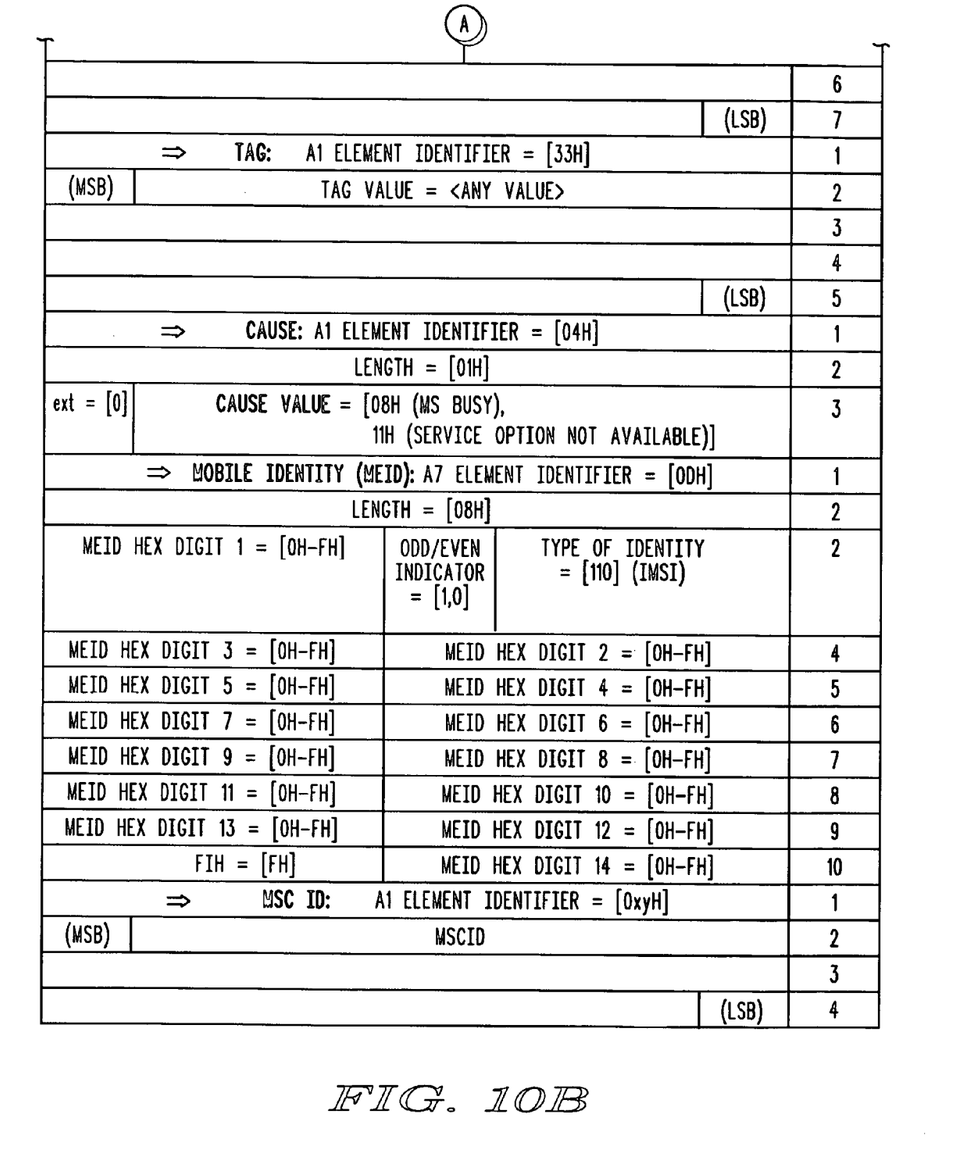

FIG. 10 shows a modified A1-BS Service Response message table and bitmap, in accordance with the present invention. This message is sent from the MSC to the HRPD AN/PCF in response to a BS Service Request. This existing message is modified to include, a MSC ID field a. to notify the Source AN/PCF that the serving MSC for the HAT in the 1x network has changed.

In summary, the present invention provides a system and method, in a communication system infrastructure including a circuit-switched network (cdma2000 1X) and an overlaid packet data network (HRPD), for cross-paging between the circuit-switched and packet data networks. The method includes a first step of providing a mobile station being on a circuit-switched communication in a first location area served by the circuit-switched network, with the mobile station having a packet data session on the packet data network.

A first packet zone of a first packet data network access node is under the domain of a first mobile switching center serving the first location area and a second packet zone of a second packet data network access node is under the domain of a second mobile switching center serving the second location area.

A next step includes the mobile station moving to a second location area served by the circuit-switched network, such that the location of the mobile station with respect to the circuit-switched network becomes unknown by the packet data network.

A next step includes attempting to page the MS by the Source packet data node of the packet data network via the circuit-switched network's Source MSC, and failing.

A next step includes informing the packet data network of a change in the areas for the mobile station by the circuit-switched network. Specifically, this step includes sending a BS Service Response message to acknowledge the BS Service Request message with the acknowledgment message containing an MSC identifier identifying the new Serving MSC presently serving the mobile station in the circuit-switched network.

A next step includes the Source AN/PCF sending a paging request message on an A13 interface of the packet data network to a paging AN/PCF served by the new Serving MSC requesting it to initiate a HRPD packet data paging in the circuit network served by the new serving MSC, the serving MSC paging the MS, and the paging AN/PCF acknowledging the paging request message with an acknowledgment message indicating the results of HRPD packet data service paging to the source AN/PCF. The nodes of the sending message can be an access network (AN) or packet control function (PCF) depending the architecture deployed.

In a first scenario, the providing step includes the first packet zone overlaying only the first location area and the second packet zone overlaying only the second location area, and wherein the moving step includes the mobile station handing of a circuit voice call from the first location area overlaid by a first packet zone of the packet data network to the second location area overlaid by a second packet zone of the overlain packet network within the second location area.

In a second scenario, the providing step includes the first packet zone overlaying both the first and second location areas (and the second packet zone overlaying only the second location area), and wherein the moving step includes the mobile station staying within a first packet zone area served by the first packet data node, and moving to a second location area in the 1x circuit network.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. In a communication system infrastructure including a circuit-switched network and an overlain packet data network, a method of cross-paging a mobile station between networks where a paging source node in the packet data network in a first location area does not connect with a mobile switching center of the circuit-switched network that is serving the mobile station in a second location area, comprising the steps of:
   providing the mobile station being on a circuit-switched communication in the first location area served by the circuit-switched network, with the mobile station maintaining a packet data session on the packet data network in the first location area;
   the mobile station moving to a second location area served by the circuit-switched network, such that the location of the mobile station with respect to the circuit-switched network becomes unknown by the packet data network;
   attempting to page the mobile station by the packet data network in the first location area via the circuit-switched network and failing;
   informing the packet data network of a change in location areas for the mobile station by the circuit-switched network by providing an identifier for the mobile switching center serving the mobile station in the second location area; and
   sending a paging request from the paging source node in the first location area on an interface between nodes of the packet data network to a target packet data node under the domain of the mobile switching center identified in the informing step.

2. The method of claim 1, further comprising the step of receiving an acknowledgement of the paging request by the paging source node from the target packet data node.

3. The method of claim 1, wherein in the paging step the paging source packet data node does not know an identity of the target packet data node.

4. The method of claim 1, wherein the nodes of the sending message include one of the group of an access network and a packet control function.

5. The method of claim 1, wherein the interface is an A13 interface of a High Rate Packet Data (HRPD) packet data network.

6. The method of claim 1, wherein the circuit-switch network is a cdma2000 1X network and the packet data network is a High Rate Packet Data (HRPD) network.

7. The method of claim 1, wherein the providing step includes a first packet zone under the domain of a first packet data node under the domain of a first mobile switching center serving the first location area and a second packet zone under the domain of a second packet data node under the domain of a second mobile switching center serving the second location area.

8. The method of claim 7, wherein the providing step includes the first packet zone overlaying a portion of only the first location area and the second packet zone overlaying only the second location area, and wherein the moving step includes the mobile station moving from the first packet zone area of the overlain packet data network within the first location area to the second packet zone area of the overlain packet data network within the second location area.

9. The method of claim 7, wherein the providing step includes the first packet zone overlaying both the first and second location areas and the second packet zone overlaying only the second location area, and wherein the moving step includes the mobile station staying within a first packet zone served by the first packet data node.

10. In a communication system infrastructure including a cdma2000 1X circuit-switched network and an overlain High Rate Packet Data (HRPD) packet data network, a method of cross-paging a mobile station between the circuit-switched and packet data networks where a paging source node in the packet data network in a first location area does not connect with a mobile switching center of the circuit-switched network that is serving the mobile station in a second location area, comprising the steps of:
   providing the mobile station being on a circuit-switched communication in the first location area served by a mobile switching center of a circuit-switched network, with the mobile station maintaining a packet data session on the packet data network in the first location area;
   the mobile station moving to a second location area served by the circuit-switched network, such that the location of the mobile station with respect to the circuit-switched network becomes unknown by the packet data network;
   attempting to page the mobile station by the packet data network in the first location area via the circuit-switched network and failing;
   providing an identifier of a mobile switching center serving the mobile station in the second location area, and
   sending a paging request from the paging source node in the first location area on an interface between nodes of the packet data network to a target packet data node under the domain of the mobile switching center identified in the providing step.

11. The method of claim 10, wherein the nodes of the sending message include one of the group of access networks and packet control functions, and wherein the interface is an A13 interface of the HRPD packet data network.

12. The method of claim 10, wherein the providing step includes a first packet zone of a first packet data node under the domain of a first mobile switching center serving the first location area and a second packet zone of a second packet data node under the domain of a second mobile switching center serving the second location area.

13. The method of claim 12, wherein the providing step includes the first packet zone overlaying only the first location area and the second packet zone overlaying only the second location area, and wherein the moving step includes the mobile station moving from a first subnet area of the overlain packet data network within the first location area to a second subnet area of the overlain packet data network within the second location area.

14. The method of claim 12, wherein the providing step includes the first packet zone overlaying both the first and second location areas and the second packet zone overlaying only the second location area, and wherein the moving step includes the mobile station staying within a first packet zone area served by the first packet data node.

15. A communication system infrastructure to provide cross-paging of a mobile station between a circuit-switched network and an overlain packet data network where a paging source node in the packet data network in a first location area does not connect with a mobile switching center of the circuit-switched network that is serving the mobile station in a second location area, the system comprising:
  a circuit-switched network operable to provide circuit-switched communication in a first location area of a first mobile switching center and a second location area of a serving mobile switching center for a mobile station;
  a packet data network operable to provide a packet data session for the mobile station, wherein the mobile station moves to the second location area served by the circuit-switched network such that the location of the mobile station with respect to the circuit-switched network becomes unknown by the packet data network; wherein an interface message is sent between nodes of the packet data network, the message informs the packet data network of a change in location areas for the mobile station by providing an identifier for the mobile switching center serving the mobile station in the second location area; and wherein a paging request is sent from the paging source node in the first location area on an interface between nodes of the packet data network to a target packet data node under the domain of the mobile switching center serving the location area of the circuit-switched network presently serving the mobile station.

16. The system of claim 15, wherein the paging source node receives an acknowledgement of the paging request from the target packet data node.

17. The system of claim 15, further comprising a paging entity to initiate a paging request from the packet data network.

18. The system of claim 17, further comprising:
  a first packet zone of a first packet data node under the domain of a first mobile switching center serving the first location area, and
  a second packet zone of a second packet data node under the domain of a second mobile switching center serving the second location area.

19. The system of claim 18, wherein the first packet zone overlays only the first location area and the second packet zone overlays only the second location area, and wherein when the mobile station moves from the first packet zone area of the overlain packet data network within the first location area to the second packet zone area of the overlain packet data network within the second location area, the interface message is sent between the nodes of the packet data network.

20. The system of claim 18, wherein the first packet zone overlays both the first and second location areas and the second packet zone overlays only the second location area, and wherein, when the mobile station stay within a first packet zone area served by the first packet data node the interface message is sent between the nodes of the packet data network.

* * * * *